United States Patent
Irby, Sr.

(10) Patent No.: US 10,486,592 B2
(45) Date of Patent: Nov. 26, 2019

(54) PEDESTRIAN DETECTION SYSTEM

(71) Applicant: David Earl Irby, Sr., Newton, MS (US)

(72) Inventor: David Earl Irby, Sr., Newton, MS (US)

( * ) Notice: Subject to any disclaimer, the term of this patent is extended or adjusted under 35 U.S.C. 154(b) by 0 days.

(21) Appl. No.: 15/460,739

(22) Filed: Mar. 16, 2017

(65) Prior Publication Data

US 2017/0267172 A1 Sep. 21, 2017

Related U.S. Application Data

(60) Provisional application No. 62/311,016, filed on Mar. 21, 2016.

(51) Int. Cl.
| | |
|---|---|
| *B60Q 1/26* | (2006.01) |
| *B60Q 9/00* | (2006.01) |
| *B60R 19/40* | (2006.01) |
| *B60R 21/00* | (2006.01) |
| *G08G 1/16* | (2006.01) |

(52) U.S. Cl.
CPC .............. *B60Q 9/008* (2013.01); *B60R 19/40* (2013.01); *B60R 21/00* (2013.01); *G08G 1/166* (2013.01)

(58) Field of Classification Search
None
See application file for complete search history.

(56) References Cited

U.S. PATENT DOCUMENTS

| | | | |
|---|---|---|---|
| 5,132,662 A * | 7/1992 | Burch | B60Q 1/50 180/271 |
| 5,281,949 A | 1/1994 | Durley | |
| 8,816,841 B2 | 8/2014 | Gustavsson | |
| 9,511,711 B2 * | 12/2016 | Petrillo | B60R 1/00 |
| 2005/0253694 A1 | 11/2005 | Kuznarowis | |
| 2008/0059069 A1 | 3/2008 | Trutna | |
| 2008/0157945 A1 * | 7/2008 | Bowler | B60Q 1/0023 340/433 |
| 2017/0225639 A1 * | 8/2017 | Chacon | B60R 21/0132 |

* cited by examiner

*Primary Examiner* — Adolf Dsouza
(74) *Attorney, Agent, or Firm* — Charles Runyan

(57) ABSTRACT

The pedestrian safety system includes a vehicle crossing arm system, an alarm annunciator, a plurality of sensors, and an in-vehicle display device. The vehicle crossing arm system may include a crossing arm and a crossing arm motor. Methods of using the pedestrian safety system function to detect movement of pedestrians in proximity to a vehicle are disclosed. In particular, for detecting movement of children in proximity to a school bus.

16 Claims, 5 Drawing Sheets

PEDESTRIAN DETECTION SYSTEM

CROSS-REFERENCE TO RELATED APPLICATION

The present application is related to and claims priority to U.S. Provisional Patent Application No. 62/311,016 filed Mar. 21, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of land vehicle alarms or indicators and more specifically relates to external alarms or indicators of movement in the vicinity of a vehicle.

2. Description of Related Art

Student safety around school buses is of utmost importance. School buses safety features may include stop signs, flashing lights, a cross arm bar, and other accessories in order to notify oncoming traffic that students are exiting or boarding a bus. Despite numerous precautions, it can be difficult for a bus driver to see whether or not all children have safely crossed in front of a bus. A bus drive may be unaware of a child still moving in front of the bus and accidentally begin to move forward. A suitable solution is desired.

U.S. Pub. No. 2005/0253694 to Kuznarowis relates to a vehicle mounted pedestrian sensor system. The Kuznarowis system includes at least four motion detectors mounted to the front, back and both sides of the vehicle, an electrical control box for receiving and interpreting signals generated by the motion detectors, and a display and control panel having indicator lamps that light in when the vehicle comes to a stop so that the sensor system can be immediately activated. The described vehicle body mounted pedestrian sensor system generates a response to one or more of motion detectors being triggered by the presence of an individual within the preset detection range that is a tone or alarm that will also sound in response to the detection of the presence of an individual. An integral sensing switch is interconnected to the control box and to any of the transmission, the drive shaft, or a wheel hub for detecting the presence of objects and individuals adjacent a vehicle. When the vehicle resumes motion, the sensor system goes to a standby mode until the integral sensing switch detects the next stoppage of the vehicle and the system is reactivated.

BRIEF SUMMARY OF THE INVENTION

In view of the foregoing disadvantages inherent in the known external alarms or indicators of movement art, the present disclosure provides a novel vehicle based pedestrian detection system.

A pedestrian safety system is disclosed herein. The pedestrian safety system may include a vehicle crossing arm system, an alarm annunciator, a plurality of sensors and an in-vehicle display device. The vehicle crossing arm system may include a crossing arm and a crossing arm motor that is configured to rotate the crossing arm from a closed position to an extended position. In one embodiment, the vehicle crossing arm system may further include a limit switch that is configured to detect the closed and extended position of the crossing arm.

The plurality of sensors may be fixedly-mounted along the crossing arm and configured to detect an object. According to one embodiment, one or more of the plurality of sensors may also be configured to be mounted in the front bumper of a vehicle. The vehicle may include a master switch that is in electronic communication with the crossing arm motor and the plurality of sensors. According to some embodiments, the plurality of sensors may be configured to operate upon receipt of a signal from the master switch. In another embodiment the plurality of sensors may be configured to receive a signal from the limit switch. As such, the sensors operate when the limit switch detects the extended position of the crossing arm and are inactive when the limit switch detects the crossing arm in a condition other than the extended position.

An alarm annunciator may include a processor configured to receive a signal from the plurality of sensors and send an output signal in response to the information detected in the signal. The alarm annunciator may further sound a highly audible alarm upon receipt of a signal from the plurality of sensors that motion is detected. Similarly, the alarm annunciator may stop the highly audible alarm upon receipt of a signal from the plurality of sensors that no motion is detected.

The in-vehicle display may include least one indicator light configured to illuminate in response to a signal transmitted by the at least one plurality of proximity sensors. In one embodiment, the light may be a red color when the plurality of sensors detect that positive motion is sensed, the light may be a yellow color when the plurality of sensors detect an object, and the light may be a green color when the plurality of sensors detect that no object or motion is sensed. According to another embodiment, the in-vehicle display may include a video display.

According to another embodiment, a method for installing a pedestrian safety device to a vehicle is also disclosed herein. The method for installing a pedestrian safety device to a vehicle may include fixing at least four sensors on the length of the crossing arm, physically securing the crossing arm to the crossing arm motor, electrically connecting the at least four sensors and the crossing arm motor to a battery and to the master switch within the vehicle, physically installing a control module inside the vehicle and operably connecting the at least four sensors to the control module, operably connecting the crossing arm motor to the control module, electronically connecting the control module to the in-vehicle display device and removably installing the in-vehicle display on the vehicle. The master switch may also be installed to control power to all of the above mentioned components simultaneously.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a vehicle based pedestrian detection system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to external alarms or indicators of movement and more particularly to a pedestrian detection system as used to improve the ability to detect movement of pedestrians in proximity to a vehicle.

Generally, many children ride on school buses to school. The present invention provides school buses with a cross arm safety system designed to notify the bus driver of unseen children exiting, boarding, or crossing in front of the bus. It utilizes sensors which communicate with LED lights to effectively notify the driver of movement around the school bus. The device, when used, prevents serious injury and deaths from occurring due to school buses prematurely moving before students have been cleared from the vicinity of the bus. As designed it includes a small motor which activates the cross-arm bar when a bus comes to a complete stop and/or when the door is opened. The present invention improves existing safety systems associated with school buses and children exiting and boarding the bus.

The instant disclosure presents a modified cross arm system with numerous sensors installed on the front of a school bus. The device is comprised of a cross arm bar, LED lights, sensors, and a cross arm motor. The LED lights may illuminate-when the sensors detect movement in front of the bus, thereby notifying the driver there are still students crossing in front of the bus. The LEDs may be available in bright colors such as red, white, yellow, and the like, in order to notify the driver that the cross arm bar is active. The cross bar may be rotationally extended via the motor when the bus comes to a complete stop and/or the door is opened thereby ensuring people may safely cross in front of the bus. With the brightly illuminated LEDs, the driver can identify exactly when all children are away from the bus's vicinity and to determine when to move once again as soon as the lights deactivate.

Referring now more specifically to the drawings by numerals of reference, there is shown in FIGS. 1-4, various views of a pedestrian safety system 100.

Figure 1A:
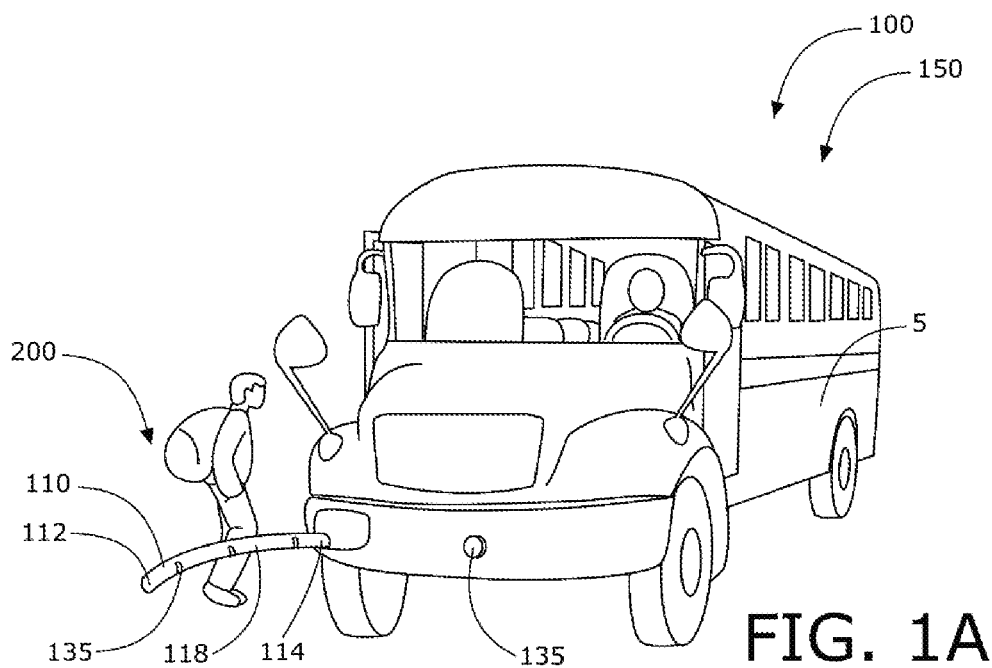
FIG. 1A is a perspective view of the pedestrian safety system during an 'in-use' condition, according to an embodiment of the disclosure.
Figure 2:
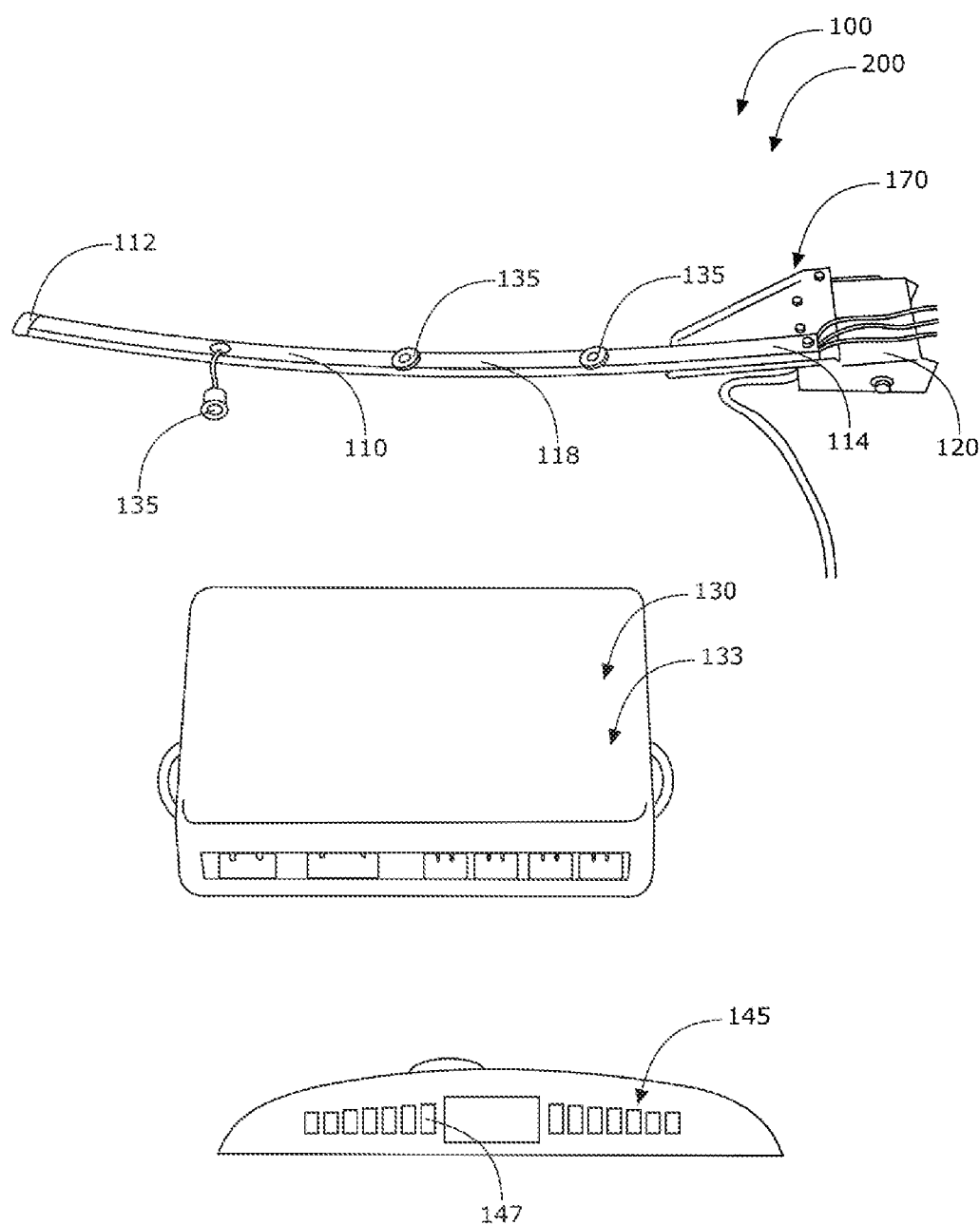
FIG. 2 is a perspective view of the pedestrian safety system of FIG. 1, according to an embodiment of the present disclosure.

FIG. 1A shows a pedestrian safety system 100 during an 'in-use' condition 150, according to an embodiment of the present disclosure. Here, the pedestrian safety system 100 may be beneficial for use by a user 140 (See, FIG. 3) to detect movement of pedestrians in proximity to a vehicle. As illustrated, the pedestrian safety system 100 may include a vehicle crossing arm system 200, an alarm annunciator 130 (FIG. 2), a plurality of sensors 135, and an in-vehicle display device 145 (FIG. 2). Here, the vehicle crossing arm system 200 is shown in an extended position according to an embodiment of the present disclosure.

Figure 1B:
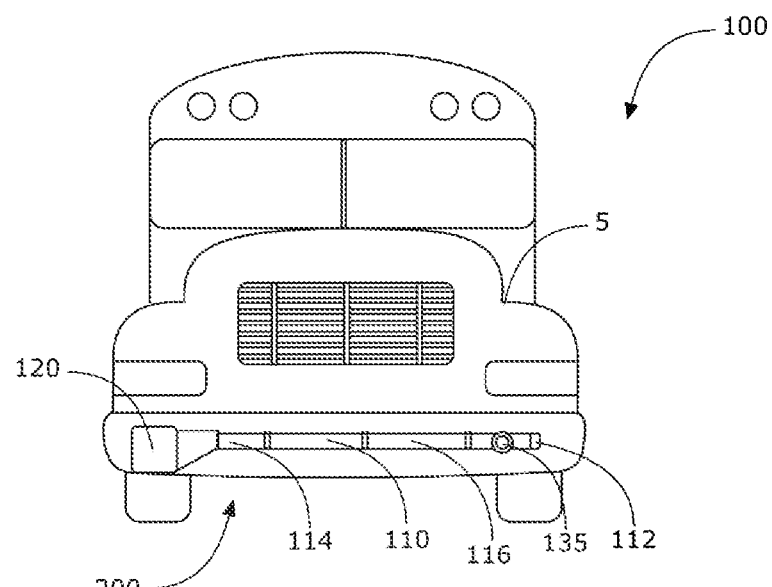
FIG. 1B is a front perspective view of the pedestrian safety system of FIG. 1, illustrating a vehicle crossing arm system in a closed position according to an embodiment of the present disclosure.

FIG. 1B shows the pedestrian safety system of FIG. 1A, according to an embodiment of the present disclosure. Here, the vehicle crossing arm system 200 is shown in a closed position 122. The vehicle crossing arm system 200 may comprise a crossing arm 110, and a crossing arm motor 120 configured to rotate the crossing arm 110 from a closed position to an extended position. In addition, the plurality of sensors 135 may be fixedly-mounted along the crossing arm 110.

The crossing arm 110 may include a distal end 112, a proximal end 114, a front surface 116 and a rear surface 118. In one embodiment, the plurality of sensors 135 may be fixedly-mounted to both the front surface 116 and the rear surface 118 of the crossing arm 110. For example, at least three sensors may be fixedly-mounted to the rear surface 118 of the crossing arm 110, and at least one sensor may be fixedly-mounted to the front surface 116 of the crossing arm 110. In a further example, at least one sensor may be fixedly-mounted to the distal end 112 of the crossing arm 110. In this example, the crossing arm motor 120 may be mounted to the proximal end 114 of the crossing arm 110, and the crossing arm motor 120 may be mounted to the vehicle 5. In one embodiment, the at least one of the plurality of sensors 135 may be configured to be mounted on the front bumper of the vehicle 5 at the proximal end 114.

In one embodiment, the vehicle crossing arm system 200 may further include a limit switch 170 configured to detect the closed and extended position of the crossing arm 110. The plurality of sensors 135 may be configured to receive a signal from the limit switch, and operate when the limit switch detects the extended position of the crossing arm 110, and to be inactive when the limit switch detects the crossing arm 110 in a condition other than the extended position. In an alternative embodiment, the vehicle 5 may include a master switch 180 in electronic communication with the crossing arm motor 120 and the plurality of sensors 135. The plurality of sensors 135 may be configured to operate upon receival of a signal from the master switch 180.

FIG. 2 shows the pedestrian safety system of FIG. 1, according to an embodiment of the present disclosure. As above, the pedestrian safety system 100 may include a vehicle crossing arm system 200 the crossing arm 110, and the crossing arm motor 120 that is configured to rotate the crossing arm 110 from the closed position 122 (FIG. 1) to the extended position (FIG. 1), the alarm annunciator 130, the plurality of sensors 135 fixedly-mounted along the crossing arm 110, and the in-vehicle display device 145 in electronic communication with the plurality of sensors 135 and the limit switch 170.

The plurality of sensors 135 may be selected from a group of sensors consisting of passive infrared sensors, lasers, microwave sensors, ultrasonic sensors, motion detecting sensors, proximity sensors, and a video camera. In one embodiment, the plurality of sensors 135 may be configured to detect movement at a range of approximately zero feet to four feet and an elevation range from approximately ground level to six feet.

The alarm annunciator 130 may include a processor (not shown) configured to receive information contained in a signal from the plurality of sensors 135 and send an output signal in response to the information received. In one embodiment, the alarm annunciator 130 may be configured to sound a highly audible alarm upon receipt of a signal from the plurality of sensors 135 that motion, or an object, is detected. Similarly, the alarm annunciator 130 may be configured to stop the highly audible alarm upon receipt of a signal from the plurality of sensors 135 that neither motion nor an object is detected.

Figure 3:
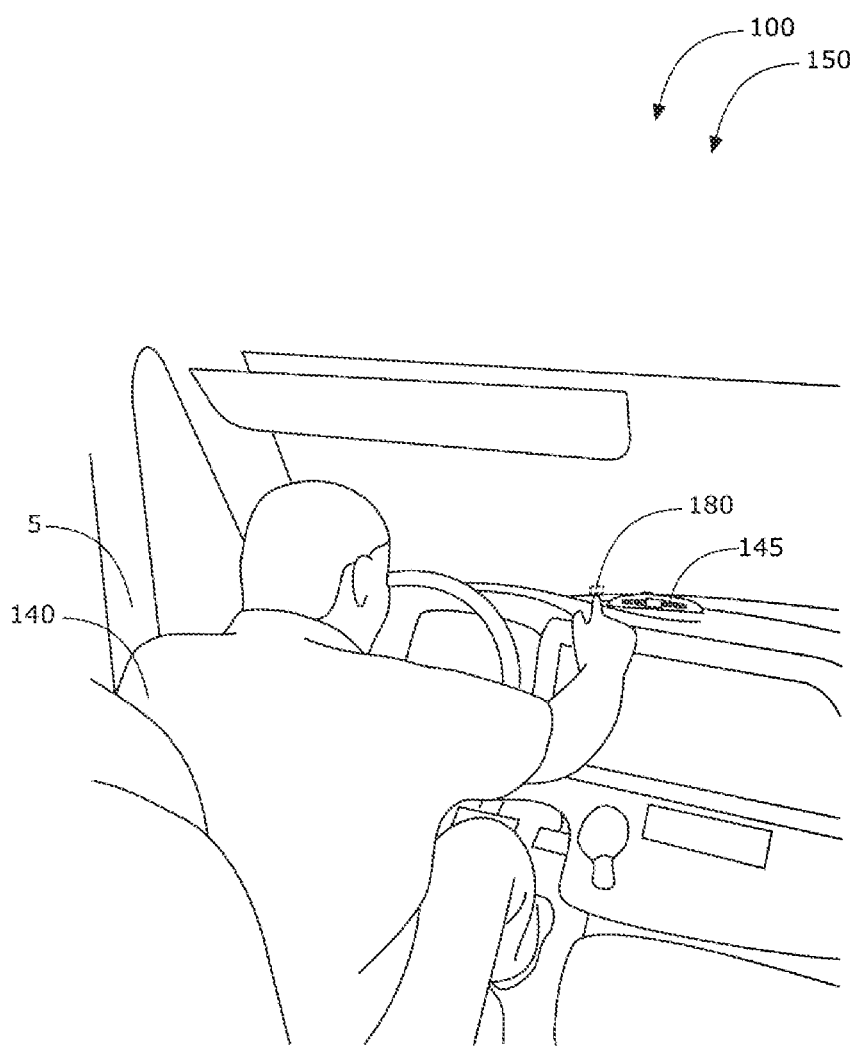
FIG. 3 is a perspective view of the pedestrian safety system during an 'in-use' condition, according to an embodiment of the present disclosure.

FIG. 3 is an exemplary perspective view of the pedestrian safety system showing an 'in-use' condition according to an embodiment of the present disclosure. Here, the user 140 can be seen closing the master switch 180 and viewing the in-vehicle display device 145. In this embodiment, the in-vehicle display device 145 may be removably installed onto a dashboard of the vehicle 5. The in-vehicle display device 145 may be installed within the vehicle 5 in a place where the in-vehicle display device 145 is easily viewed by the user 140 when the user 140 is seated in a driver seat within the vehicle 5.

Figure 4:
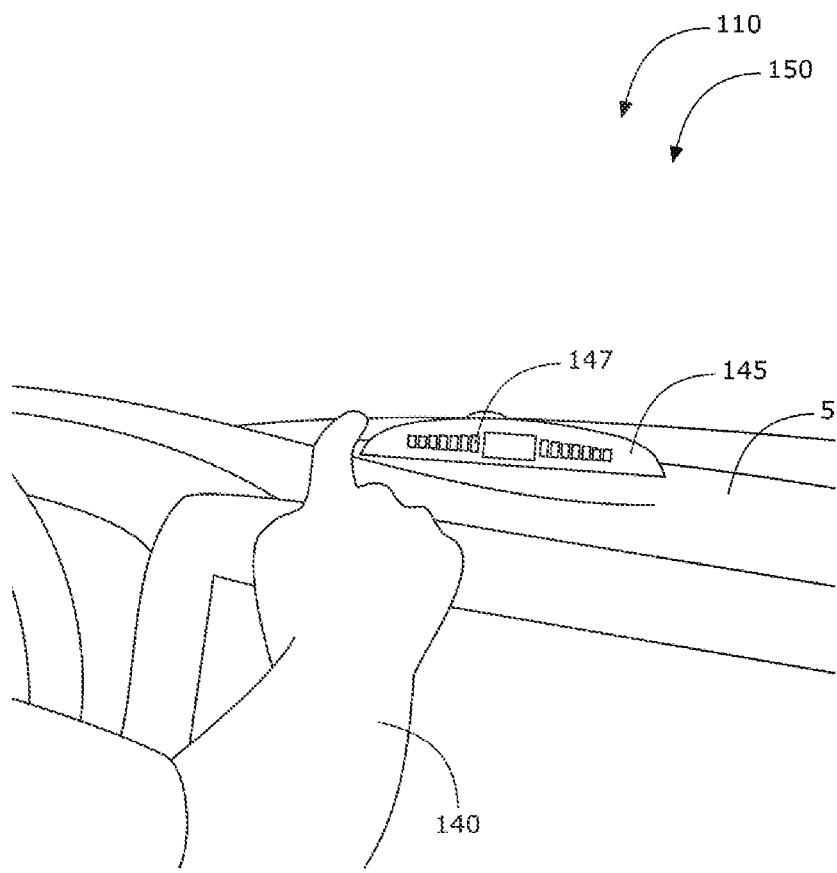
FIG. 4 is a perspective view of the pedestrian safety system of FIG. 3, illustrating an in-vehicle display device according to an embodiment of the present disclosure.

FIG. 4 is a perspective view of the in-vehicle display device 145 of FIG. 3, according to an embodiment of the present disclosure. The in-vehicle display 145 may include at least one light 147 configured to illuminate in response to a signal transmitted by the at least one plurality of sensors 135. In some embodiments, the at least one light 147 may be at least one LED light configured to display a plurality of colors. In a further embodiment, the in-vehicle display device 145 may include a video display.

The at least one LED light 147 may be configured to illuminate a red color in response to the signal transmitted by the plurality of sensors 135 that positive motion is sensed. In this example, a red color on the in-vehicle display device 145 may indicate that the pedestrian is present and it is not safe for the driver to proceed. Similarly, the at least one LED light 147 may be configured to illuminate a yellow color in response to the signal transmitted by the plurality of sensors 135 that an object is detected. In this example, the yellow color may serve as a warning to the driver that there may be the pedestrian in close proximity to the vehicle 5. Further, the at least one LED light 147 may be configured to illuminate a green color in response to the signal transmitted by the plurality of sensors 135 that no object or motion is sensed. This green color may indicate to the driver that it is clear to proceed.

In a preferred embodiment, the alarm annunciator 130 (FIG. 2) may sound the highly audible alarm upon receival a signal from the plurality of sensors 135 that motion is detected, and the alarm annunciator 130 may be configured to stop the highly audible alarm upon receival of a signal from the plurality of sensors 135 that no motion is detected. In this preferred example, the alarm annunciator 130 may sound the highly audible alarm while the red color or the yellow color is illuminated by the at least one LED light 147 on the in-vehicle display device 145, and the alarm annunciator 130 may stop the highly audible alarm when the green color is illuminated by the at least one LED light 147 on the in-vehicle display device 145.

Figure 5:
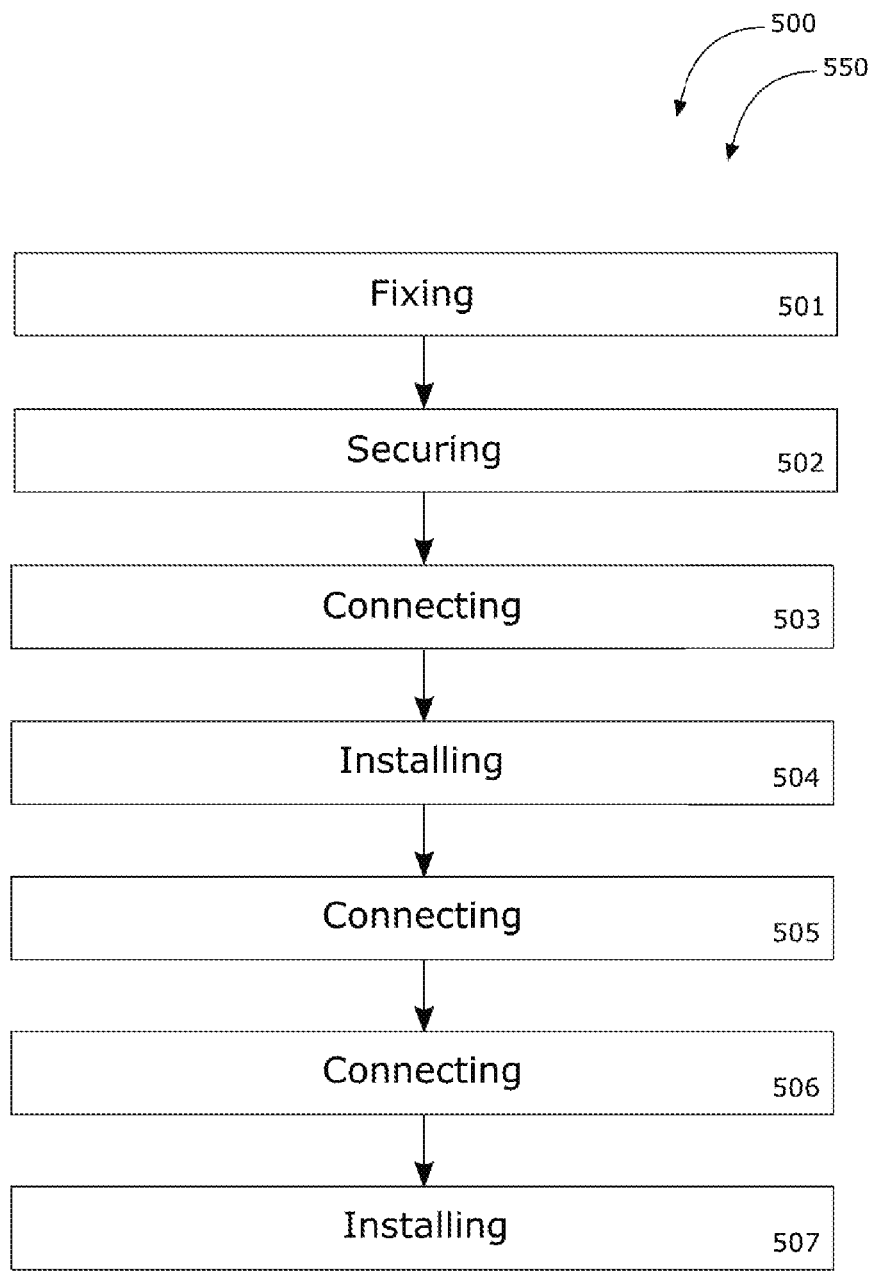
FIG. 5 is a flow diagram illustrating a method for installing a pedestrian safety device to a vehicle, according to an embodiment of the present disclosure.

FIG. 5 is a flow diagram illustrating a method for installing a pedestrian safety device to a vehicle, according to an embodiment of the present disclosure. In particular, the method for installing the pedestrian safety device to the vehicle 500 may include one or more components or features of the pedestrian safety device 100 as described above. As illustrated, the method for installing the pedestrian safety device to the vehicle 500 may include the steps of: fixing one or more sensors 135 on the length of the crossing arm 110 in step one 501. The one or more sensors 135 being configured to detect an object. Step two 502, physically securing the crossing arm 110 to the crossing arm 110 motor 120 installed on the vehicle, the crossing arm motor 120 being configured to rotate the crossing arm 110 from a closed position to an extended position. Step three 503, electrically connecting the one or more sensor 135 and the crossing arm motor 120 to a battery and to the master switch 180 within the vehicle 5. Step four 504, physically installing a control module 133 inside the vehicle and operably connecting the one or more sensor 135 to the control module 133. Step five 505, operably connecting the crossing arm motor 120 to the control module 133. Step six 506, electronically connecting the control module 133 to the in-vehicle display device 145. Step seven 507, removably installing the in-vehicle display 145 on the vehicle 5. Some embodiments described herein may require at least four sensors.

In a further method for installing the pedestrian safety device to the vehicle 500, the crossing arm motor 120 may include the limit switch 170 configured to detect the closed and extended position of the crossing arm 110. This method may include the steps of: fixing the one or more sensor 135 on the length of the crossing arm 110, the one or more sensor 135 configured to detect an object, step two 502, physically securing the crossing arm 110 to the crossing arm motor 120 installed on the vehicle 5; step three 503, physically installing the control module 133 inside the vehicle and operably connecting the at least four sensors 135 to the control module 133; step four 504; operably connecting the crossing arm motor 120 to the control module 133; step five 505, electronically connecting the control module 133 to an in-vehicle display device 145; and step six 506, removably installing the in-vehicle display 145 on the vehicle 5.

It should be noted that step 503 is an optional step and may not be implemented in all cases. It should also be noted that the steps described in the method of use can be carried out in many different orders according to user preference.

The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for installing the pedestrian safety device to the vehicle 500 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pedestrian safety system, the pedestrian safety system comprising:
    a vehicle crossing arm system comprising a crossing arm and a crossing arm motor, the crossing arm motor being configured to rotate the crossing arm from a closed position to an extended position and a limit switch configured to detect the closed and extended position of the crossing arm;
    an alarm annunciator;
    a plurality of sensors fixedly-mounted along the crossing arm, the plurality of sensors being configured to detect an object and to receive a signal from the limit switch and operate when the limit switch detects the extended position of the crossing arm and to be inactive when the limit switch detects the crossing arm in a condition other than the extended position;
    and
    an in-vehicle display device in electronic communication with the plurality of sensors.

2. The pedestrian safety system of claim 1, wherein at least one of the plurality of sensors is configured to be mounted in the front bumper of the vehicle.

3. The pedestrian safety system of claim 1, wherein the vehicle includes a master switch in electronic communication with the crossing arm motor and the plurality of sensors, and the plurality of sensors are configured to operate upon receipt of a signal from the master switch.

4. The pedestrian safety system of claim 1, wherein the alarm annunciator includes a processor configured to receive a signal from the plurality of sensors and send an output signal in response to the information received.

5. The pedestrian safety system of claim 4, wherein the alarm annunciator is configured to sound a highly audible alarm upon receival receipt of a signal from the plurality of sensors that motion is detected, and the alarm annunciator is configured to stop the highly audible alarm upon receival receipt of a signal from the plurality of sensors that no motion is detected.

6. The pedestrian safety system of claim 1, wherein the in-vehicle display includes at least one light, the at least one light being configured to illuminate in response to a signal transmitted by the at least one plurality of proximity sensors.

7. The pedestrian safety system of claim 6, wherein the at least one light is at least one LED light configured to display a plurality of colors.

8. The pedestrian safety system of claim 7, wherein the at least one LED light is configured to illuminate a red color in response to the signal transmitted by the plurality of sensors that positive motion is sensed, and the at least one LED light is configured to illuminate a yellow color in response to the signal transmitted by the plurality of sensors that an object is detected, and the at least one LED light is configured to illuminate a green color in response to the signal transmitted by the plurality of sensors that no object or motion is sensed.

9. The pedestrian safety system of claim 8, wherein the in-vehicle display includes a video display.

10. A vehicle crossing arm system, the vehicle crossing arm system comprising:
    a crossing arm, the crossing arm including a distal end, a proximal end, a front surface and a rear surface;
    a crossing arm motor, the crossing arm motor mounted to the proximal end of the crossing arm, the crossing arm motor configured to rotate the crossing arm from a closed position to an extended position;
    a limit switch configured to detect the closed and extended position of the crossing arm;
    and
    a plurality of sensors fixedly-mounted along the crossing arm, the plurality of sensors being configured to detect an object, and transmit a signal to indicate the presence of an object proximate to at least one of the plurality of sensors,
wherein the plurality of sensors are configured to receive a signal from the limit switch, and operate when the limit switch detects the extended position of the crossing arm, and to be inactive when the limit switch detects the crossing arm in a condition other than the extended position.

11. The vehicle crossing arm system of claim 10, wherein the plurality of sensors may be selected from a group consisting of passive infrared sensors, lasers, microwave sensors, ultrasonic sensors, motion detecting sensors, proximity sensors, and a video camera.

12. The vehicle crossing arm system of claim 11, wherein the plurality of sensors are configured to detect movement at a range of approximately zero feet to four feet and an elevation range from approximately ground level to six feet.

13. The vehicle crossing arm system of claim 12, wherein the plurality of sensors are fixedly-mounted to both the front side and the rear side of the crossing arm.

14. The vehicle crossing arm system of claim 13, wherein at least three sensors are fixedly-mounted to the rear side of the crossing arm.

15. The vehicle crossing arm system of claim 14, wherein at least one sensor is fixedly-mounted to the front side of the crossing arm.

16. The vehicle crossing arm system of claim 15, wherein at least one sensor is fixedly-mounted to the distal end of the crossing arm.

* * * * *